(12) United States Patent
Kaneko

(10) Patent No.: US 7,887,916 B2
(45) Date of Patent: Feb. 15, 2011

(54) PROCESS FOR PRODUCING SANDWICH STRUCTURE AND ADHESIVE FILM USED THEREFOR

(75) Inventor: Manabu Kaneko, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/542,912

(22) Filed: Aug. 18, 2009

(65) Prior Publication Data

US 2009/0305035 A1    Dec. 10, 2009

Related U.S. Application Data

(62) Division of application No. 11/015,023, filed on Dec. 20, 2004, now abandoned.

(51) Int. Cl.
  *B32B 27/08* (2006.01)
  *B32B 27/12* (2006.01)
  *B32B 27/30* (2006.01)
  *B32B 27/36* (2006.01)

(52) U.S. Cl. ............. 428/355 EP; 428/343; 428/355 R; 428/355 EN; 428/355 AC; 428/413; 428/480; 526/204; 526/266; 526/273; 526/317.1; 528/106; 528/122; 528/403; 442/149; 442/394; 442/395

(58) Field of Classification Search ........................ None
  See application file for complete search history.

(56) References Cited

U.S. PATENT DOCUMENTS

| | | | |
|---|---|---|---|
| 3,538,187 A | | 11/1970 | Feltzin |
| 3,637,459 A | | 1/1972 | Parish et al. |
| 3,669,921 A | * | 6/1972 | Droke et al. ............... 524/394 |
| 3,724,048 A | | 4/1973 | Duesberg |
| 3,763,274 A | | 10/1973 | Wang et al. |
| 3,883,612 A | * | 5/1975 | Pratt et al. ................. 525/170 |
| 3,948,859 A | * | 4/1976 | Sublett et al. .............. 528/304 |
| 4,011,358 A | | 3/1977 | Roelofs ....................... 428/516 |
| 4,059,715 A | * | 11/1977 | Pletcher ...................... 428/349 |
| 4,066,820 A | * | 1/1978 | Kelly et al. ................. 428/483 |
| 4,310,644 A | * | 1/1982 | Miley ......................... 525/507 |
| 4,340,526 A | * | 7/1982 | Petke et al. ................. 524/292 |
| 4,384,083 A | * | 5/1983 | Baker ..................... 525/420.5 |
| 4,405,689 A | * | 9/1983 | Watanabe .................... 428/467 |
| 4,468,426 A | * | 8/1984 | Hatchadoorian et al. .... 428/213 |
| 4,604,319 A | * | 8/1986 | Evans et al. ................. 442/164 |
| 4,742,148 A | * | 5/1988 | Lee et al. .................... 528/117 |
| 4,786,343 A | | 11/1988 | Hertzberg |
| 4,859,528 A | * | 8/1989 | Lee et al. .................... 442/180 |
| 4,874,833 A | * | 10/1989 | Kershaw ...................... 528/90 |
| 4,954,382 A | * | 9/1990 | Riefler et al. ............... 428/116 |
| 5,118,558 A | * | 6/1992 | Mater et al. ................. 442/287 |
| 5,166,007 A | * | 11/1992 | Smith et al. ................... 428/63 |
| 5,225,265 A | * | 7/1993 | Prandy et al. ............... 428/138 |
| 5,340,907 A | * | 8/1994 | Yau et al. .................... 528/274 |
| 5,397,618 A | * | 3/1995 | Cedarleaf ................... 428/138 |
| 5,447,593 A | * | 9/1995 | Tanaka et al. ............. 156/307.3 |
| 5,476,237 A | | 12/1995 | Clarke |
| 5,567,499 A | | 10/1996 | Cundiff et al. |
| 5,685,940 A | | 11/1997 | Hopkins et al. |
| 5,780,147 A | * | 7/1998 | Sugahara et al. ............ 428/332 |
| 6,042,930 A | * | 3/2000 | Kelch et al. .............. 428/195.1 |
| 6,114,042 A | | 9/2000 | Warzelhan et al. |
| 6,171,700 B1 | | 1/2001 | Sugita et al. |
| 6,183,842 B1 | | 2/2001 | Shimizu et al. |
| 6,387,479 B1 | * | 5/2002 | Hayashi et al. .......... 428/297.4 |
| 6,602,958 B2 | * | 8/2003 | Briggs et al. ................ 525/192 |
| 6,743,520 B2 | * | 6/2004 | Street et al. ................. 428/483 |
| 6,776,865 B1 | | 8/2004 | Yamaguchi |
| 6,855,402 B2 | | 2/2005 | Rabinovitch et al. |
| 6,863,973 B2 | | 3/2005 | Tomokuni et al. |
| 6,890,401 B2 | * | 5/2005 | Bernetich ................ 156/307.5 |
| 7,014,803 B2 | | 3/2006 | Perez et al. |
| 7,070,860 B2 | * | 7/2006 | Kobayashi et al. .......... 428/412 |
| 7,101,825 B2 | * | 9/2006 | Francis et al. ............... 503/227 |
| 7,186,310 B2 | | 3/2007 | Yamaguchi et al. |
| 7,258,760 B2 | | 8/2007 | Yamaguchi et al. |
| 7,531,121 B2 | * | 5/2009 | Nakano et al. .............. 264/322 |
| 2002/0176979 A1 | | 11/2002 | Evans |
| 2003/0077410 A1 | | 4/2003 | Yamaguchi et al. |
| 2003/0082339 A1 | | 5/2003 | Bernetich |
| 2004/0200571 A1 | | 10/2004 | Yamaguchi et al. |
| 2005/0123717 A1 | | 6/2005 | Shen et al. |
| 2005/0249937 A1 | | 11/2005 | Yamada et al. |
| 2006/0008611 A1 | | 1/2006 | Shen et al. |
| 2006/0125155 A1 | | 6/2006 | Sekido et al. |
| 2006/0134408 A1 | * | 6/2006 | Kaneko ....................... 428/343 |

FOREIGN PATENT DOCUMENTS

| | | |
|---|---|---|
| EP | 0 786 330 | 7/1997 |
| JP | 2004-322345 | 11/2004 |
| JP | 2004-322502 | 11/2004 |

OTHER PUBLICATIONS

Braun, et al., Rheology Modifiers Handbook—Practical Use and Application, William Andrew Publishing, pp. 157-160 (2000).
Vana, et al., Radical Polymerization, Encyclopedia of Polymer Science and Technology, John Wiley & Sons, pp. 435-441 (2005).

* cited by examiner

*Primary Examiner*—Vivian Chen
(74) *Attorney, Agent, or Firm*—Oblon, Spivak, McClelland, Maier & Neustadt, L.L.P.

(57) ABSTRACT

An adhesive film comprising a cycloalkanediol modified copolymerized polyester resin film and a thermosetting vinyl ester resin composition layer which is hardened at room temperature on said polyester resin film.

11 Claims, No Drawings

PROCESS FOR PRODUCING SANDWICH STRUCTURE AND ADHESIVE FILM USED THEREFOR

RELATED APPLICATIONS

This Application is a divisional of application Ser. No. 11/015,023, filed Dec. 20, 2004, abandoned.

BACKGROUND OF THE INVENTION

1. Field of the Invention

The present invention relates to a method for infusing and molding a liquid resin for producing a sandwich structure in a block, without performing pretreatment on a core material.

2. Description of Related Art

Currently, fiber reinforced resin compositions are widely used because they are light in weight and very strong. In particular, a filament reinforced thermosetting resin composition has been advantageously used in airplanes, ships, railroad vehicles, cars, golf clubs, tennis rackets, etc., as a substitute for a metal material because it is light in weight, has high rigidity, and is very strong. In addition, further reduction in weight can be anticipated because of the dynamics characteristic thereof, and hence a sandwich structure material is attractive.

However, in general, the sandwich structure material is produced by laminating a prepreg, then heating the resultant laminated prepreg in an autoclave under a pressurized condition, and hence the conventional method has a problem in that it necessitates a large amount of labor, thermal energy, and plant-and-equipment investment, thereby making manufacturing and processing cost high. Then, a method of pouring a liquid thermosetting resin into glass or carbon fiber textiles and then hardening it has been developed, which is called RTM (Resin Transfer Molding) and VARTM (Vacuum-Assisted RTM). In this method, an expensive prepreg is not used, the textiles are laminated simply, and an autoclave is not used, and hence production of a fiber reinforced resin composition can be performed at a cost lower than that of the prepreg method.

However, the above method of pouring the liquid resin, such as RTM and VARTM, is not suitable for producing the sandwich structure material using hollow cores of which the surfaces are not closed, such as a honeycomb core and an open cell foam core, because the liquid resin enters into the hollow cores to increase the core weight remarkably. Therefore, it is necessary to adhere the facing material to the core material which were fabricated separately according to the conventional method, to obtain a sandwich structure material. Recently, a method which includes heating and adhering a cover material to a core material beforehand to obtain a fabricated core material, installing the fabricated core material as well as the other members in a mold, clamping or bagging the mold, and thereafter pouring a liquid resin into the mold to mold has also been developed. However, this method requires a step for fabricating the core as an individual step, and moreover, this method has a problem in that when the molded object has a curved surface, it requires a metal mold for fabricating the core material to form the curved surface of the core material, in addition to the main mold for preparing the sandwich structure material, thereby increasing production cost.

In the Japanese Unexamined Patent Application, First Publication No. 2003-39579, the use of impermeable resin film and the non-low viscosity type film is disclosed, and in the Japanese Unexamined Patent Application, First Publication No. H09-295362, the use of a specific resin and/or moisture cover film, and a film adhesive is disclosed. Moreover, in the Japanese Unexamined Patent Application, First Publication No. 2000-167950, application of a seal material which has thermosetting type adhesive performance is disclosed. However, although the producing process of these sandwich structures can be performed in batch processing in a metal mold, since it is necessary to heat it before pouring liquid resin therein, it is necessary to harden the adhesives and the seal material to seal the honeycomb core etc., and hence there is still a problem of the heating and hardening process being necessary to seal the core.

Thus, in the conventional method, heating is necessary to seal the hollow core of which the surface has not been closed, such as a honeycomb core and an open cell foam core. Particularly, in VARTM fabrication of a large article, a large oven is necessary, and the equipment expense and operating cost increase. Therefore, a method which can eliminate the heating process, and reduce consumption energy and labors is desired strongly.

Therefore, it is an object of the present invention to provide a process for producing a sandwich structure and an adhesive film used therefor, which can overcome the problem of the conventional technique. More specifically, it is an object of the present invention to provide a process for producing a sandwich structure and an adhesive film used therefor, which can produce a sandwich structure at a low cost, low energy consumption, and low labor, without heating and large scale equipment.

SUMMARY OF THE INVENTION

The process for producing a sandwich structure of the present invention includes: laminating a reinforced fiber material which is substantially free from a matrix resin; a glycol modified copolymerized polyester resin film; a thermosetting resin composition film which is hardened at room temperature; a core material selected from an open cell foam and a honeycomb; a thermosetting resin composition film which is hardened at room temperature; a glycol modified copolymerized polyester resin film; and a reinforced fiber material which is substantially free from a matrix resin, in this order in a molding tool to form a sandwich, hardening the thermosetting resin composition film which is hardened at room temperature under condition that the molding tool is closed, infusing a matrix resin into the molding tool, and adjusting a temperature in the molding tool at room temperature or a hardening temperature of the matrix resin to harden the matrix resin.

Here, a cycloalkanediol modified copolymerized polyester resin may be exemplified as the glycol modified copolymerized polyester resin.

Similarly, a cycloalkanediol modified copolymerized polyethylene terephthalate resin may be exemplified as the glycol modified copolymerized polyester resin.

Similarly, the glycol modified copolymerized polyester resin film and the thermosetting resin composition film which is hardened at room temperature may previously form an adhesive film consisting of the glycol modified copolymerized polyester resin film and a thermosetting resin composition which is hardened at room temperature, which is held uniformly thereon.

Similarly, the thermosetting resin composition film which is hardened at room temperature may have a cloth as a carrier.

Similarly, the cloth used as the carrier may be a nonwoven fabric.

Similarly, the thermosetting resin composition which forms the thermosetting resin composition film which is hardened at room temperature preferably has a viscosity of 2 to 200 Pa·S.

Similarly, a thermosetting resin composition consisting of a vinyl polymerizable compound may be exemplified as the thermosetting resin composition which forms the thermosetting resin composition film which is hardened at room temperature.

Similarly, a vinyl ester resin may be exemplified as the vinyl polymerizable compound.

Similarly, the thermosetting resin composition which forms the thermosetting resin composition film which is hardened at room temperature may contain a viscosity increasing agent.

Similarly, a polyethylene oxide may be exemplified as the viscosity increasing agent.

Similarly, the thermosetting resin composition which forms the thermosetting resin composition film which is hardened at room temperature may contain a polymerization retardant or inhibitor.

4-methoxyphenol may be exemplified as the polymerization retardant inhibitor.

Similarly, a molding tool in which the interior can be depressurized is employable as the molding tool.

Similarly, the hardening of the thermosetting resin composition film which is hardened at room temperature may be performed under a depressurized state.

Similarly, pressing an upper molding tool and/or a lower molding tool may be included between; laminating a reinforced fiber material which is substantially free from a matrix resin; a glycol modified copolymerization polyester resin film; a thermosetting resin composition film which is hardened at room temperature; a core material selected from an open cell foam and a honeycomb; a thermosetting resin composition film which is hardened at room temperature; a glycol modified copolymerization polyester resin film; and a reinforced fiber material which is substantially free from a matrix resin, in this order in a molding tool to form a sandwich; and hardening the thermosetting resin composition film which is hardened at room temperature under the conditions that the molding tool is closed.

Similarly, a vinyl ester resin and an epoxy resin may be exemplified as the matrix resin.

Similarly, a frame member which prevents the matrix resin from penetrating into the core material may be disposed at the circumference of the core material.

The adhesive film of the present invention includes a glycol modified copolymerization polyester resin film, and a thermosetting resin composition which is hardened at room temperature, which is held uniformly on the glycol modified copolymerized polyester resin film.

DETAILED DESCRIPTION OF THE INVENTION

Hereafter, a preferred embodiment of the present invention will be explained.

"Sandwich Structure"

The sandwich structure of the present invention is constituted from a resin board which is reinforced by a reinforcing fiber material as a facing material, and a core material which is put between the resin boards. As for the core material and the facing material of the sandwich structure of the present invention, there are no particular limitations in the thickness of the core material and the facing material, and hence the thickness thereof can be designed corresponding to demanded characteristics.

"Molding Tool"

There are no particular limitations about the quality of the material of the molding tool in the present invention. The molding tool consists of a single mold or double molds. In the case in which a single mold is employed, when the single mold is used as a lower mold, a covering material such as a resin film is used as an upper mold. In this case, the mold may be used as the upper mold or the lower mold. It is preferred that the interior of the molding tool of the present invention can depressurized.

"Reinforcing Fiber Material"

The reinforcing fiber material used in the present invention is not particularly limited. For example, organic fibers such as a carbon fiber, a boron fiber, an aramid fiber, a polyethylene fiber, a liquid crystal polymer fiber, and a polyacetal fiber; inorganic fibers such as a glass fiber, an alumina fiber and a silicon carbide fiber; and a metal fiber, etc., may be exemplified. In addition, these reinforcing fiber textiles and knittings in which the fibers were composited may also be used.

"Impermeable Resin Film"

The impermeable resin film of the present invention blocks the matrix resin which has not yet hardened thereby adhering to the matrix resin after being hardened. For example, a modified polyester resin and a polyetherimide resin film may be exemplified. The impermeable resin is preferably a glycol modified copolymerized polyester resin, and more preferably a cycloalkanediol modified copolymerized polyester.

"The Thermosetting Resin Composition Film which is Hardened at Room Temperature"

The thermosetting resin composition film which is hardened at room temperature used in the present invention is not necessarily solid individually, and it may be one which consists of a liquid or a viscose thermosetting resin composition and a carrier which holds the thermosetting resin composition thereon. A resin film, a cloth-like material, a textile, a nonwoven fabric, or the like, may be exemplified, as the carrier.

They may preferably be a nonwoven fabric and a resin film. As for the thermosetting resin composition which is hardened at room temperature which constitutes the thermosetting resin composition film which is hardened at room temperature, it is preferred to have a viscosity of 2 to 200 Pa·s.

Here, if the viscosity is less than 2 Pa·s, the resin composition on the upper side of the core material falls below too much by gravity, and a problem that a quantity required for adhering the facing material to the core material cannot be held will arise. On the other hand, if the viscosity exceeds 200 Pa·s, a problem that the resin composition on the upper side of the core material hardly hangs down below by gravity, and cannot supply a quantity required for adhering the facing material to the core material will arise.

A thermosetting resin having the viscosity can be selected and it can also attain the viscosity by adding a thickening agent to a thermosetting resin. By adjusting reaction time, it can also attain the viscosity by proceeding the reaction to increase the viscosity, thereby laminating it to the core material with a desired viscosity. Although the thickening agent is not particularly limited, for example, a polycarbonate, a polystyrene, and a polyethylene oxide are preferred, and further, a polyethylene oxide is more preferred as the thickening agent. As for the thermosetting resin composition which is hardened at room temperature which constitutes the thermosetting resin composition film which is hardened at a temperature, an epoxy resin, a vinyl ester resin, a polyester resin, a phenol resin, a urea resin, a melamine resin, a polyurethane resin, a polyimide resin, a PITI resin, a cyanate resin, a bismaleimide resin, a BCB resin, a COPNA resin, a gum resin, a poly benzimidazole resin, an acrylic resin, a cyanoacrylate resin, an acetic acid ester resin, a silicone resin, etc., may be exemplified, for example. Preferably, the thermosetting resin composition which is hardened at room temperature which constitutes the thermosetting resin composition film which is hardened at a temperature is constituted from vinyl polymerizable compounds. A vinyl ester resin is more preferred. To the thermosetting resin composition which is hardened at room temperature which constitutes the thermosetting resin composition film which is hardened at a temperature, a polymerization retardant can be added, in order to extend the working life. For example, a 4-methoxy phenol, a hydroquinone, and a 2,4-pentadione may be exemplified. A preferred polymerization retardant is 4-methoxy phenol.

"Core Material"

The core material used in the present invention is a hollow core material. Specifically, an open cell foam and a honeycomb material may be exemplified. The open cell foam which is used in the present invention is not particularly limited. Either an open cell foam made of an organic material and an open cell foam made of an inorganic material may be used. A polyurethane foam, a poly methacrylic imide foam, a poly acrylate foam, a polyvinyl chloride foam, a carbon foam, etc., may be exemplified.

The honeycomb material which is used in the present invention is not particularly limited. Any of a honeycomb material made of an organic material, a honeycomb material made of a metallic material, and a honeycomb made of an inorganic material may be used. An aluminum honeycomb, a stainless steel honeycomb, a steel honeycomb, a Kevlar™ honeycomb, a Nomex™ honeycomb, a carbon honeycomb, a polyvinyl chloride honeycomb, a polypropylene honeycomb, a polyethylene honeycomb, a polyurethane honeycomb, a polycarbonate honeycomb, a poly ether imide honeycomb, a ceramic honeycomb, etc., may be exemplified. An aluminum honeycomb, a Nomex™ honeycomb, a Kevlar™ honeycomb, and a carbon honeycomb are preferred.

"The Lamination Method of the Material"

In one piece of a molding tool, a desired amount of reinforcing fibers which have not yet substantially contained a matrix resin are arranged. Subsequently, an impermeable resin film and a thermosetting resin film which is hardened at room temperature are arranged. Subsequently, after disposing a desired core material, the thermosetting resin film which is hardened at room temperature, the impermeable resin film, and a desired amount of the reinforcing fibers which have not substantially contained a matrix resin yet are arranged respectively. Next, mold closing is performed by joining another piece of the molding tool thereto or using a bagging film such as a nylon film, etc. In the case in which the molding tool is both mold type, clamping pressure is applied thereto. At this time, the inside of the molding tool may be depressurized. In the case in which the molding tool is a single mold type, the inside of the bag may be depressurized using a vacuum pump, etc. It is preferred that the thermosetting resin be hardened at the time of clamping the molding tool in the case in which a two moldings type molding tool is used, or at the time of depressurized in the case in which a single molding type molding tool is used, respectively, that is when the material in the molding tool is deformed along the inner wall of the molding tool.

"The Infusion Method of a Matrix Resin"

A matrix resin may be infused into the molding tool using positive pressure and may be sucked into the molding tool using negative pressure in the molding tool.

"The Hardening Method of the Matrix Resin"

The matrix resin can be hardened by a desired method. The matrix resin may be hardened at room temperature, and may be heated to a desired temperature. When the inside of the molding tool is being depressurized, it is preferred to keep on depressurizing during hardening of the matrix resin.

WORKING EXAMPLES

Working Examples will be explained hereinafter; however, the present invention is not limited thereto.

Raw Materials Used

As carbon fiber textiles, TR3110MS (brand name, which is a product of Mitsubishi Rayon Co., Ltd.) was used.

As nonwoven fabric, the following ones were used.
ECULE™ 3501A (a product of TOYOBOU Co., Ltd.)
3151A (a product of TOYOBOU Co., Ltd.)

As thermoplastic film, DIAFIX PG-WHI (a product of Mitsubishi Plastics Inc.: 0.2 mm in thickness, 0.1 mm in thickness, and 0.05 mm in thickness) which was PET-G, was used.

As a thermosetting resin, the following ones were used.

Vinyl ester resin: DERAKANE MOMENTUM 411-350 (a product of Dow Chemical Co., Ltd.)

Initiator: Trigonox 239A (a product of Akzo novel Co., Ltd.)

Catalyst: NUODEX (a product of CONDEA Servo LLC: 6 wt % Cobalt ion solution)

Poly(ethylene oxide) (a product of Scientific Polymer Products, Inc. Mw 400,000) was used as a thickening agent.

Moreover, 4-Methoxyphenol (product made from Sigma-Aldrich Co., Ltd., 99%) was used as a polymerization retardant.

The following were used as a honeycomb core.

Aluminum honeycomb: DURA 5056 1.6-3/8 (produced by Alcore, Inc.) (which has a thickness of 10 mm, a density of 26 $kg/m^3$, and a cell size of 9.5 mm)

Aluminum honeycomb: DURA 5056 3.4-1/4 (produced by Alcore, Inc.) (which has a thickness of 10 mm, a density of 55 $kg/m^3$, and a cell size of 6.4 mm)

Hereafter, a measuring method will be explained.

Flatwise Tensile Strength

Measurements were made according to ASTM C297. The sandwich panel was cut to 76 mm in length and 76 mm in width by a grinder cutter. The surface thereof was roughened by a sand blaster and fixed to an aluminum block with an adhesive (Loctite Hysol EA 9309.3NA, having a cure time of not less than 48 hours at room temperature). The peel strength of the facing material from the core was measured in the tensile test. The number of measurements was set to 5.

The following were used as measuring apparatus.
Instron 4484
Load cell: 30 kN

Moreover, the crosshead speed was 0.5 mm/min.

Areal Weight

As to the areal weight, the sandwich panel was cut to 76 mm in length and 76 mm in width, by a grinder cutter. Using a slide caliper having the minimum scale of 0.01 mm, the length of the cut sandwich panel was measured at three points in length and breadth, respectively to be averaged. Area was calculated from this value. Weight was measured by an electronic balance (the minimum of 0.1 mg). The value which is obtained by dividing the weight of the panel sample by the area is set to the Areal weight. The unit thereof is $g/m^2$.

Working Example 1

A PET-G film (0.2 mm in thickness) (300 mm×210 mm) was disposed to a table, and a piece of nonwoven fabric ECULE 3501A™ (292 mm×203 mm) was installed thereon. 34 g of a compounded vinyl ester resin for impregnation (which was prepared by mixing a vinyl ester resin in an amount of 100 weight part, an initiator in an amount of 2 weight part, and a catalyst in an amount of 0.033 weight part, and then being degassed for 3 minutes under a negative pressure of not less than 0.085 MPa) was impregnated quickly into the nonwoven fabric ECULE 3501A™ using a putty knife to obtain an adhesion film (1). The areal weight of impregnated resin at this time was $5.7\times10^2$ $g/m^2$. One more adhesion film (1) was obtained similarly. A mold releasing agent was applied onto the other table, and dried. Subsequently, a piece of a thick nonwoven fabric (368 mm×279 mm) was disposed thereon, and one piece of peel ply (368 mm×305 mm) and two pieces of carbon fiber textiles (318 mm×229 mm) were disposed thereon. One piece of the adhesion film (1) was disposed onto the disposed carbon fiber textiles, such that the nonwoven fabric might come upside the carbon fiber textiles. Subsequently, a honeycomb core DURA 5056 1.6-3/8™ (267 mm×178 mm) was disposed thereon, and the adhesion film (1) was disposed thereon such that the nonwoven fabric might descend. And two pieces of carbon fiber textiles (318 mm×229 mm) were disposed thereon. Subsequently, one piece of peel ply (368 mm×305 mm) was disposed thereon, and one piece of a thick nonwoven fabric (267 mm×229 mm) was disposed further thereon. An inlet for a liquid resin was disposed linearly and aside the core material for a sandwich structure material, such that the inlet should be parallel to the longitudinal direction of the core material, and that the infused liquid resin can permeate into both the nonwoven fabric on upper side and on lower side. Similar to the inlet, a deaerating port was disposed linearly at the opposite side of the inlet across the core material. Subsequently, a bag film made of nylon was made to cover it, and the bag film was sealed with a sealing tape on the table. Subsequently, the inside of the bag was deaerated to be not less than 0.085 MPa of negative pressure with a vacuum pump. Bagging end time was 32 minutes after the timing when the compounding of the vinyl ester resin for impregnating was completed. The thermosetting resin for impregnating was made to impregnate into a 30 mm×30 mm nonwoven fabric of ECULE™ to be allowed to stand on a nylon film, and hardening state of the vinyl ester resin for impregnating was observed. It was 233 minutes after the timing when the compounding of the vinyl ester resin for impregnating was completed, that the tackiness of the vinyl ester resin for impregnating was lost. After 390 minutes from the completion of compounding the vinyl ester resin for impregnating, a sufficient amount of the compounded vinyl ester resin (which was obtained by degassing a mixture of a vinyl ester resin in an amount of 100 weight part, an initiator in an amount of 2 weight part, and a catalyst in an amount of 0.1 weight part, for 3 minutes under a negative pressure of not less than 0.085 MPa) was sucked from the inlet side using a negative pressure. The inlet was closed after being checked visually that the liquid resin had fully filled the inside of the bag. It was allowed to stand for a night while deaerating to harden the compounded resin at a normal temperature, thereby obtaining a sandwich panel (1) which was a sandwich structure. During the molding, the temperature of the room was kept at 19° C.

Working Example 2

A sandwich panel (2) was obtained by performing the same process as in Working Example 1, with the exception of adjusting the bagging end time to be 56 minutes after the completion of compounding of the vinyl ester resin for impregnating, and of adjusting the time for infusing the matrix resin to be 277 minutes after the completion of compounding of the vinyl ester resin for impregnating. The temperature of the room was kept at 21° C. It was 125 minutes after the timing when the compounding of the vinyl ester resin for impregnating was completed, that the tackiness of the vinyl ester resin for impregnating was lost.

Working Example 3

A sandwich panel (3) was obtained by performing the same process as in Working Example 1, with the exception of adjusting the bagging end time to be 45 minutes after the completion of compounding of the vinyl ester resin for impregnating, and of adjusting the time for injecting the matrix resin to be 284 minutes after the completion of compounding of the vinyl ester resin for impregnating. The temperature of the room was kept at 21° C. It was 121 minutes after the timing when the compounding of the vinyl ester resin for impregnating was completed that the tackiness of the vinyl ester resin for impregnating was lost.

Working Example 4

A PET-G film (0.05 mm in thickness) (300 mm×210 mm) was disposed onto a table, and one piece of nonwoven fabric ECULE™ 3151A (292 mm×203 mm) was disposed thereon. 3.09 parts of a thickening agent (poly (ethylene oxide)) and a 0.1 parts of a polymerization retardant (4-methoxyphenol) was added to a vinyl ester for impregnating (which is a mixture of a vinyl ester resin in an amount of 100 parts by weight, an initiator in an amount of 4 parts by weight, and a catalyst in an amount of 0.033 parts by weight), and agitated sufficiently. 23 g of a vinyl ester for impregnating which was degassed for 3 minutes under a negative pressure of not less than 0.085 MPa was impregnated quickly to a nonwoven fabric ECULE™ 3151A using a putty knife to obtain an adhesion film (2). The areal weight of the impregnated resin at this time was $3.8\times10^2$ $g/m^2$. One more adhesion film (2) was obtained similarly. A mold releasing agent was applied onto another table, and dried. Subsequently, one piece of a thick nonwoven fabric (368 mm×279 mm) was disposed thereon, and one piece of peel ply (368 mm×305 mm) and two pieces of carbon fiber textiles (318 mm×229 mm) were disposed thereon. One piece of the adhesion film (2) was disposed onto the disposed carbon fiber textiles, such that the nonwoven fabric might come above the carbon fiber textiles. Subsequently, a honeycomb core DURA 5056 1.6-3/8™ (267 mm×178 mm) was disposed thereon, and the adhesion film (2) was disposed thereon such that the nonwoven fabric might come below. And two pieces of carbon fiber textiles (318 mm×229 mm) were disposed thereon. Subsequently, one piece of peel ply (368 mm×305 mm) was disposed thereon, and one piece of a thick nonwoven fabric (267 mm×229 mm) was disposed further thereon. An inlet for a liquid resin was disposed linearly and aside the core material for a sandwich structure material, such that the inlet should be parallel to the longitudinal direction of the core material, and that the infused liquid resin can permeate into both the nonwoven fabric on the upper side and on the lower side. Similar to the inlet, a deaerating port was disposed linearly at the opposite side of the inlet across the core material. Subsequently, a bag film made of nylon was made to cover it, and the bag film was sealed with a sealing tape on the table. Subsequently, the inside of the bag was deaerated to be not less than 0.085 MPa of negative pressure with a vacuum pump. Bagging end time was 65 minutes after the timing when the compounding of the vinyl ester resin for impregnating was completed. After 2682 minutes from the completion of compounding the vinyl ester resin for impregnating, a sufficient amount of the compounded vinyl ester resin (which was obtained by degassing a mixture of a vinyl ester resin in an amount of 100 weight part, an initiator in an amount of 2 weight part, and an accelerator in an amount of 0.1 weight part, for 3 minutes under a negative pressure of not less than 0.085 MPa) was sucked from the inlet side using a negative pressure. The inlet was closed after checked visually that the liquid resin had fully filled the inside of the bag. It was allowed to stand for a night while deaerating to harden the compounded resin at a normal temperature, thereby obtaining a sandwich panel (4) which had a sandwich structure. During the molding, the temperature of the room was kept at 21° C.

Working Example 5

A sandwich panel (5) was obtained in the same way as in Working Example 4, with the exception of substituting the honeycomb with DURA 5056 3.4-1/4, substituting the nonwoven fabric with ECULE 3501A converting the thickness of the PET-G film into 0.1 mm, converting the impregnating amount of the vinyl ester for impregnating into 33 g, adjusting the bagging end time to be after 52 minutes from the completion of compounding the vinyl ester resin for impregnating, and of adjusting the matrix resin injecting time to be after 3166 minutes from the completion of compounding the vinyl ester resin for impregnating. During the molding, the temperature of the room was held at 19° C.

Comparative Example 1

A mold releasing agent was applied onto a table and was dried. Subsequently, one piece of a thick nonwoven fabric (368 mm×279 mm) was disposed thereon, and one piece of peel ply (368 mm×305 mm) and two pieces of carbon fiber textiles (318 mm×229 mm) were disposed thereon. Subsequently, a honeycomb core DURA 5056 1.6-3/8™ (267 mm×178 mm) was disposed thereon, and two pieces of carbon fiber textiles (318 mm×229 mm) were disposed thereon. Subsequently, one piece of peel ply (368 mm×305 mm) was disposed thereon, and one piece of a thick nonwoven fabric (267 mm×229 mm) was disposed further thereon. An inlet for a liquid resin was disposed linearly and aside the core material for a sandwich structure material, such that the inlet was parallel to the longitudinal direction of the core material, and that the infused liquid resin can permeate into both the nonwoven fabric on the upper side and on the lower side. Similar to the inlet, a deaerating port was disposed linearly at the opposite side of the inlet across the core material. Subsequently, a bag film made of nylon was made to cover it, and the bag film was sealed with a sealing tape on the table. Subsequently, the inside of the bag was deaerated to not less than 0.085 MPa of negative pressure with a vacuum pump. Thereafter, a sufficient amount of the compounded vinyl ester resin (which was obtained by degassing a mixture of a vinyl ester resin in an amount of 100 weight part, an initiator in an amount of 2 weight part, and an accelerator in an amount of 0.1 weight part, for 3 minutes under a negative pressure of not less than 0.085 MPa) was sucked from the inlet side using a negative pressure. The inlet was closed after checking visually that the liquid resin had fully filled the inside of the bag. It was allowed to stand for a night while deaerating to harden the compounded resin at a normal temperature, thereby obtaining a sandwich panel (6) which was a sandwich structure. During the molding, the temperature of the room was held at 23° C.

Referential Example 1

A mold releasing agent was applied onto a table and was dried. Subsequently, two pieces of carbon fiber textiles (318 mm×229 mm) were disposed thereon. One piece of peel ply (368 mm×305 mm) was disposed thereon, and one piece of a thick nonwoven fabric (295 mm×280 mm) was disposed thereon. The inlet for a liquid resin was formed linearly at the center. Tow deaerating ports were formed at both sides of the carbon fiber textiles like 2, respectively, linearly similar to the inlet. Subsequently, a bag film made of nylon was made to cover it, and the bat film was sealed with a sealing tape on the table. Subsequently, the inside of the bag was deaerated to be not less than 0.085 MPa of negative pressure with a vacuum pump. Thereafter, a sufficient amount of the compounded vinyl ester resin (which was obtained by degassing a mixture of a vinyl ester resin in an amount of 100 weight part, an initiator in an amount of 2 weight part, and an accelerator in an amount of 0.1 weight part, for 3 minutes under a negative pressure of not less than 0.085 MPa) was sucked from the inlet using a negative pressure. The inlet was closed after being checked visually that the liquid resin had fully filled the inside of the bag. It was allowed to stand for a night while deaerating to harden the compounded resin at a normal temperature, thereby obtaining a carbon fiber composite sheet.

When an areal weight of the carbon fiber composite sheet was measured, it was $6.0 \times 10^2$ g/m$^2$. When an areal weight of nonwoven fabric ECULE™ 3501A was measured, it was 48 g/m$^2$. When an areal weight of an aluminum honeycomb DURA 5056 1.6-3/8 was measured, it was $2.7 \times 10^2$ g/m$^2$. When an areal weight of a PET-G film (0.2 mm in thickness) was measured, it was $2.5 \times 10^2$ g/m$^2$.

To the sum of areal weights of two pieces of carbon fiber composite sheets, two pieces of a non woven fabric ECULE™, the aluminum honeycomb, and the two pieces of PET-G films, the areal weight of the impregnating resin for two adhesion films were added, as a result, the total thereof became $3.2 \times 10^3$ g/m$^2$.

Measurement

Test pieces were cut from the sandwich panel, and flatwise tensile strength and areal weight thereof were measured. The results are shown in Table 1.

TABLE 1

| | Sandwich panel | | | | | |
|---|---|---|---|---|---|---|
| | 1 | 2 | 3 | 4 | 5 | 6 |
| Flatwise tension strength (MPa) | 1.7 | 1.1 | 2.1 | 2.6 | 3.4 | — |
| Areal weight (g/m$^2$) | $3.2 \times 10^3$ | $3.2 \times 10^3$ | $3.2 \times 10^3$ | $2.6 \times 10^3$ | $3.3 \times 10^3$ | $1.1 \times 10^4$ |

In Comparative Example 1 which is a conventional method, the matrix resin permeated into the honeycomb cell, and hence the areal weight of the resultant panel produced therefrom is enormous. As shown in the Reference Example, the calculated sum of the areal weight of each member of the sandwich panel (1), (2), and (3) is $3.2 \times 10^3$ g/m$^2$, and is the same as the actual value of the areal weight of each sandwich panel of Working Examples. Therefore, it turns out that the permeation of the matrix resin into the core can be prevented by 100%. Moreover, as the panel (4) indicated, reduction of sandwich panel weight and improvement in the peel strength of a facing sheet can be attained by optimizing the member and the additive amount of the resin for adhesion film, and adding of the thickening agent. Moreover, as the sandwich panel (5) indicated, peel strength can be increased by enlarging the cell size of a honeycomb core.

In the present invention, it is possible to prevent the matrix resin from permeating into the core, and to adhere the impermeable resin film of the present invention to the facing sheet, without heating for sealing the core. Moreover, the heating process can be completely eliminated by using a matrix resin which can be hardened at room temperature. Therefore, according to the present invention, it is possible to produce a sandwich structure without performing a heading operation, when producing a sandwich structure including an unsealed hollow core, thereby reducing energy to be used and equipment cost.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An adhesive film, comprising a cycloalkanediol modified copolymerized polyester resin film, and a thermosetting vinyl ester resin composition which is hardened at room temperature, which is held uniformly on the glycol modified copolymerized polyester resin film.

2. The adhesive film as set forth in claim 1, wherein the cycloalkanediol modified copolymerized polyester is a cycloalkanediol modified copolymerized polyethylene terephthalate resin.

3. The adhesive film as set forth in claim 1, wherein the thermosetting resin composition film which is hardened at room temperature has a cloth as a carrier.

4. The adhesive film as set forth in claim 3, wherein the cloth used as the carrier is a nonwoven fabric.

5. The adhesive film as set forth in claim 1, wherein the thermosetting resin composition which forms the thermosetting resin composition film which is hardened at room temperature has a viscosity of 2 to 200 Pa·s.

6. The adhesive film as set forth in claim 1, wherein the thermosetting resin composition which forms the thermosetting resin composition film which is hardened at room temperature consists of a vinyl ester resin compound.

7. The adhesive film as set forth in claim 6, wherein the thermosetting resin composition which forms the thermosetting resin composition film which is hardened at room temperature contains a viscosity increasing agent.

8. The adhesive film as set forth in claim 7, wherein the viscosity increasing agent is polyethylene oxide.

9. The adhesive film as set forth in claim 6, wherein the thermosetting resin composition which forms the thermosetting resin composition film which is hardened at room temperature contains a polymerization retardant or inhibitor.

10. The adhesive film as set forth in claim 9, wherein the polymerization retardant or inhibitor is 4-methoxyphenol.

11. The adhesive film as set forth in claim 1, wherein the thermosetting resin composition film is hardened at room temperature under a depressurized state.

* * * * *